United States Patent [19]

Shorter

[11] Patent Number: 5,201,049

[45] Date of Patent: * Apr. 6, 1993

[54] SYSTEM FOR EXECUTING APPLICATIONS PROGRAM CONCURRENTLY/SERIALLY ON DIFFERENT VIRTUAL MACHINES

[75] Inventor: David U. Shorter, Lewisville, Tex.

[73] Assignee: International Business Machines Corporation, Armonk, N.Y.

[*] Notice: The portion of the term of this patent subsequent to Nov. 5, 2008 has been disclaimed.

[21] Appl. No.: 750,661

[22] Filed: Sep. 20, 1991

Related U.S. Application Data

[63] Continuation of Ser. No. 250,632, Sep. 29, 1988, Pat. No. 5,063,500.

[51] Int. Cl.$^5$ .......................... G06F 9/06; G06F 9/30; G06F 9/38; G06F 15/15

[52] U.S. Cl. .................................. 395/650; 364/231.9; 364/280; 364/286; 364/281.7; 364/281.5; 364/DIG. 1

[58] Field of Search ........................ 395/800, 650, 200

[56] References Cited

U.S. PATENT DOCUMENTS

| | | | |
|---|---|---|---|
| 4,694,396 | 9/1987 | Weisshaar et al. | 364/200 |
| 4,835,685 | 5/1989 | Kun | 364/200 |
| 4,849,880 | 7/1989 | Bhaskar et al. | 364/200 |
| 4,862,349 | 8/1989 | Foreman et al. | 364/200 |
| 4,885,681 | 12/1989 | Umeno et al. | 364/200 |

*Primary Examiner*—Thomas C. Lee
*Assistant Examiner*—Ayni Mohamed
*Attorney, Agent, or Firm*—Andrew J. Dillon

[57] ABSTRACT

A method to preserve system resources during the execution of distributed application programs in an SNA type data processing network that supports program to program communication between an Intelligent Work Station (IWS) and a host processor in accordance with SNA Logical Unit 6.2 protocols when a Virtual Machine Pool Manager exists at the host processor and functions to, (1) create a pool of virtual machines at the host processor that are brought to a run ready state prior to any program to program communication, (2) dynamically assign an idle run ready virtual machine to process each request from the IWS involving one application program so that sequential requests from the one program are assigned to different ones of the idle virtual machines and run concurrently, and (3) provide a Pool Manager Data Structure for use by the Pool Manager during the step of dynamically assigning the idle run ready virtual machines in the pool. The Operating System for the IWS attaches a process identifier (PRID) and a thread identifier (THRID) to predefined segments of the resident application program that include LU 6.2 type conversation requests. The ID are transmitted to the host at the time a request is transmitted to permit the Virtual Machine Pool Manager to decide, based on the transmitted ID and previously received IDs whether to assign the request to an active or idle virtual machine in the pool. If the ID is the same as a segment being run on an active machine, the request are assigned to the same machine. If the transmitted (THRID) is different, the request is assigned to an idle machine in the pool. Therefore, predefined segments can be executed concurrently on different assigned virtual machines at the host only when the application program segments have been assigned different THRIDS by the terminal operating system.

10 Claims, 8 Drawing Sheets

| | | |
|---|---|---|
| L-1 | END USER | PROGRAMS FOR END USER |
| L-2 | NAU SERVICES | MANAGE NETWORK SESSION SERVICES PRESENTATION SERVICES |
| L-3 | DATA FLOW CONTROL | MAINTAIN SEND-RECEIVE MODES. HIGH LEVEL ERROR CORRECTING |
| L-4 | TRANSMISSION CONTROL | SESSION LEVEL PACING ENCRYPTION AND DECRYPTION |
| L-5 | PATH CONTROL | ROUTING SEGMENTING DATA UNITS VIRTUAL ROUTE PACING |
| L-6 | DATA LINK | ERROR CONTROL, LINK LEVEL ADDRESS SEQUENCING |
| L-7 | PHYSICAL | SIGNAL CHARACTERISTICS OF CONNECTOR PIN ASSIGNMENTS |

*Fig. 3*

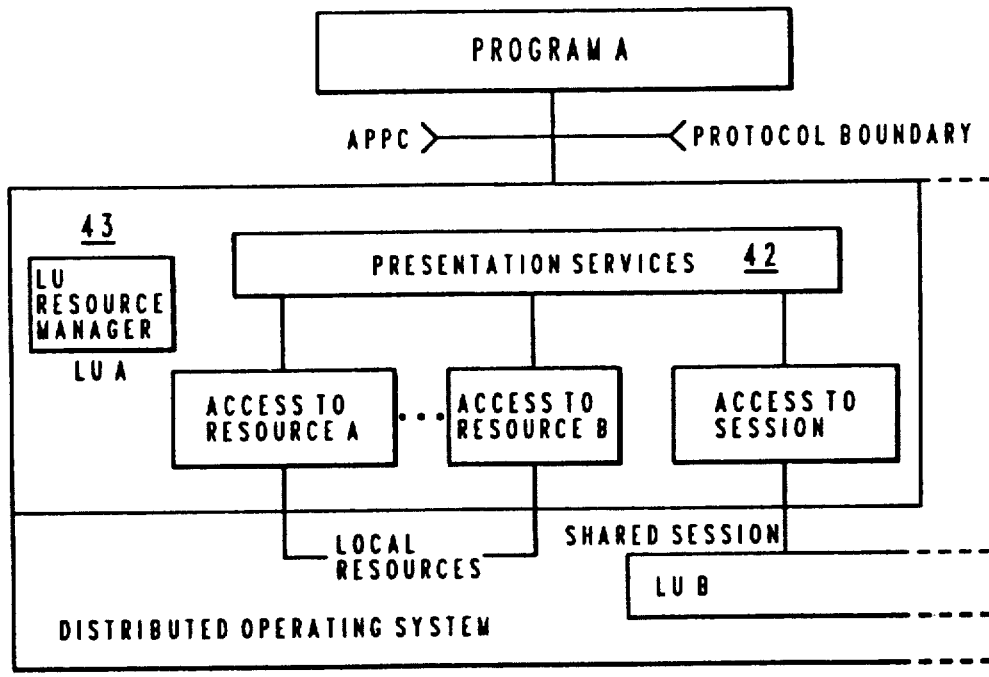

| (1) VMNAME | (2) POINTER | (3) USERID | (4) PCID | (5) BUSY |
|---|---|---|---|---|
| VM01 | 00010000 | DICKC | TERM0001 | YES |
| VM02 | | | | NO |
| VM03 | | | | NO |
| VM04 | | | | NO |
| | | | | NO |
| VMnn | | | | NO |

CONTROL BLOCK ANCHOR

52

ADDRESS 00010000

| (6) CONVID | (7) PRID | (8) THRID | (9) POINTER | (10) TPNNAME |
|---|---|---|---|---|
| CON001 | PRID0001 | THRID001 | 00000000 | MAIL02 |

CONTROL BLOCK EXTENSION 1

Fig. 6B

| (1) VMNAME | (2) POINTER | (3) USERID | (4) PCID | (5) BUSY |
|---|---|---|---|---|
| VM01 | 00010000 | DICKC | TERM0001 | YES |
| VM02 | | | | NO |
| VM03 | | | | NO |
| VM04 | | | | NO |
| | | | | NO |
| VMnn | | | | NO |

CONTROL BLOCK ANCHOR

ADDRESS 00010000

| (6) CONVID | (7) PRID | (8) THRID | (9) POINTER | (10) TPNNAME |
|---|---|---|---|---|
| CON001 | PRID0001 | THRID001 | 00010100 | MAIL02 |

CONTROL BLOCK EXTENSION 1

ADDRESS 00010100

| (6) CONVID | (7) POINTER | (8) TPNNAME |
|---|---|---|
| CON002 | 00000000 | MAIL02 |

CONTROL BLOCK EXTENSION 2

SYSTEM FOR EXECUTING APPLICATIONS PROGRAM CONCURRENTLY/SERIALLY ON DIFFERENT VIRTUAL MACHINES

This application is a continuation of application Ser. No. 07/250,632, filed Sep. 29, 1988, now U.S. Pat. No. 5,063,500.

CROSS REFERENCE TO RELATED APPLICATIONS

U.S. application Ser. No. 07/261,861, now U.S. Pat. No. 5,062,037, entitled "Method to Provide Concurrent Execution of Distributed Application Programs by a Host Computer and an Intelligent Work Station on an SNA Network" which is filed concurrently herewith and is assigned to the Assignee of the present invention, is directed to a method for executing LU 6.2 conversations for distributed application programs which involves creating a pool of virtual machines at the host which are maintained in a run ready idle state until assigned by a Virtual Machine Pool Manager to a request, from a terminal executing a first part of a distributed application program, for a conversation with the second part of the distributed application program stored at the host system.

U.S. application Ser. No. 07/250,598, now U.S. Pat. No. 4,949,254, entitled "Method to Manage Concurrent Execution of a Distributed Application Program by a Host Computer and a Large Plurality of Intelligent Work Stations of an SNA Network" which is filled concurrently herewith and is assigned to the Assignee of the present invention, is directed to a method for providing improved communications between distributed portions of an application program that is being executed on a network simultaneously by a relatively large number of terminals, in which a pool of virtual machines is created at the host and each machine is primed (initialized) with the host resident portion of the program. When a conversation request is received at the host and assigned to a virtual machine in the pool, the machine is ready to accept the request and begin processing immediately. The pool manager monitors the use of the pool relative to anticipated demand and adjusts the size accordingly in accordance with an established algorithm.

FIELD OF INVENTION

This invention relates in general to inter-program communication methods in data processing networks comprising a host system connected to a plurality of intelligent workstations and in particular to a method for providing improved communications between distributed portions of an application program.

BACKGROUND ART

The prior art discloses a variety of computer networks. The IBM System Journal, Volume 22, Number 4, 1983 includes a series of articles devoted to a review of the IBM System Network Architecture (SNA). On page 345 of that publication a network is defined as "a configuration of terminals, controllers, and processors and the links that connect them. When such a configuration supports user applications involving data processing and information exchange and conforms to the specifications of the System Network Architecture it is called an SNA network. Essentially SNA defines logical entities that are related to the physical entities in a network and specifies the rules for interactions among these logical entities.

The logical entities of an SNA network include network addressable units and the path control network that connects them. Network addressable units communicate with one another using logical connections called "sessions." The three types of Network Addressable Units (NAUs) are the Logical Unit (LU), the Physical Unit (PU), and the System Services Control Point (SSCP) which are defined as follows;

Logical Unit (LU): An LU is a port through which end users may access the SNA network. An end user uses an LU to communicate with another end user and to request services of a System Services Control Point (SSCP).

Physical Unit (PU): A PU is a component that manages the resources of a node in cooperation with an SSCP.

System Services Control Point (SSCP). This is a focal point for configuration management, problem determination and directory services for end users. SSCPs may have sessions with LUs and PUs. When such a session occurs, the LU or PU is in the domain of the SSCP. In addition to sessions with LUs and PUs, SSCPs may also communicate with each other to coordinate the initiation and the termination of sessions between Logical Units and in different domains."

From the hardware standpoint, a simple network comprises a host system having a processing unit and a plurality of remote terminals that are assigned to individual users. The remote terminals are selectively connectable to the host system through one or more communication links. These links may comprise merely a coaxial cable, a dedicated telephone line, or in some cases, a satellite communication link.

The host processing unit most always has an operating system which supports the creation of a large number of virtual machines or the functional equivalents, each of which is assigned, on request, to an end user. A virtual machine processes tasks for the assigned end user, by time sharing the host processor hardware of the host system. Some hosts systems may include more than one hardware processor so that true simultaneous processing occurs at the host since a plurality of processors are running in parallel. More often, there is merely one hardware processor that "concurrently" runs data processing tasks for the virtual machines by a time sharing technique. This is transparent to the end users at the terminals.

Two general types of terminals are employed in data processing networks. The first is referred to as a "dumb terminal" in that it comprises merely a keyboard and a display device and little or no processing capability other than that required to make a connection with the host system. The second type of terminal is referred to as an Intelligent Work Station (IWS) and is provided with its own processor unit, Operating System and supporting peripheral devices. The terms IWS and Personal Computer (PC) are often used interchangeably. With the ready availability of PCs having very attractive price performance characteristics, most new networks are implemented with IWS type terminals and many of the older networks are being modified with the replacement of dumb terminals with IWS type terminals.

Providing each end user on the network with its own processing capability relieves the host CPU from doing many of the data processing tasks that were previously done at the host. The nature of the tasks that are processed by the host CPU therefore has changed and more sophisticated applications such as electronic mail and electronic calendaring are now implemented on the network under the control of the host system. Both of these applications involve what is referred to as distributed application programs, in that one part of the application program is resident on the host system and another is resident on the IWS terminal.

Many of the current data processing networks are designed in accordance with the IBM SNA architecture which was first described in 1974. Since then various new functions and services have been added. As suggested earlier, SNA networks can be viewed as a plurality of nodes interconnected by data links. At each of these nodes, path control elements send information packets, referred to as Path Information Units (PIUs), between resource managers called Logical Units. The logical connections of the paths are called a session. A transport network for data is therefore defined by the path control elements and the data link control elements.

Nodes can be connected by a plurality of links and comprise a plurality of LUs. Various types of LUs sessions and protocols have been established within the framework of the SNA architecture. There are three general classes of sessions. The first class is unspecified by SNA. The second class involves terminals and the third involves program to program communication. For example LU 6 provides SNA defined inter-program communication protocols which avoids the limitations of terminal LU types such as LU 2 and LU 7. LU 6.2 is referred to as Advanced Program to Program Communication or APPC protocols.

Logical Units are more than message ports. LUs provide operating system services such as program to program communication involving one or more local programs. Each application program views the LUs as a local operating system and the network of loosely coupled LUs connected by sessions as a distributed operating system.

The LU allocates a plurality of resources to its programs, which are dependent on the particular hardware and its configuration. Some of the resources that are made available are remote while others are local, i.e., associated with the same LU as the application program. The sessions are considered local resources at each LU, but are shared between particular LUs.

The control function of an LU is resource allocation. Programs ask one for access to a resource. Sessions which carry messages between LUs or programs running on LUs are considered shared resources. A session is divided so that a plurality of conversations are run serially.

Two LUs connected by a session have a shared responsibility in allocating sessions to application programs for use as "conversations." The application programs are therefore sometimes referred to as "transaction programs."

The successful connection between LUs occurs as a result of a common set of protocols which function first to activate a session between two LUs and second to facilitate the exchange of message data.

The SNA format and protocol reference manual designated SC30-3112, published by the IBM Corporation describes SNA by defining, for example, with programming language declarations, the format of messages that flow between network entities and the programs that generate, manipulate, translate, send and return messages.

The SNA transaction program reference manual for LU 6.2 referred to as GC30-3084, published by the IBM Corporation defines the verbs that describe the functions provided by the implementing products.

Intelligent work stations that are connected to a SNA type network and employ an LU 6.2 protocol to process an application program that is distributed between the IWS and the host system operate efficiently so long as the operating system of the IWS does not run more than one application concurrently at the terminal. However, if the IWS is operating under an operating system such as OS/2, which allows an IWS such an IBM PS/2 personal computer to run concurrent application programs which are distributed, the advantage of concurrent operation on the PS/2 is lost. The advantage is lost because at the host, the separate transactions which are run concurrently at the terminal become serialized. The serialization of the transaction occurs because the host creates only one virtual machine that is permanently associated with the user ID and the specific terminal as long as the session is active.

In order to avoid the serialization at the host, the second application being run at the terminal has to be run with a different user ID in order to have a separate virtual machine established at the host that will be dedicated solely to the second application.

The invention described in the cross-referenced application Ser. No. 07/261,861, now U.S. Pat. No. 5,062,037 directed to a method to permit two or more distributed applications that are being run concurrently on one intelligent work station of a data processing network to be executed on separate virtual machines created by the host system to prevent the applications from becoming serialized at the host and to allow each to be run concurrently with the other on both the host and the terminal.

With the method of the cross-referenced application, the host system creates a plurality of virtual machines (VMs) that are brought to a run ready state prior to and in anticipation of being assigned to a distributed application program for processing a task which has been defined in said distributed application program, part of which is resident on the host system and the companion part of which is resident on one of the IWS end user terminals. The pool of run ready VM machines are preferably created automatically at the time that the host system is initialized under the control of a pool manager, which is a program resident on the host system, whose other main function is to assign an idle VM machine from the pool in response to an end user request that identifies a distributed application program, a previously assigned Logical Unit name and a USERID. The VM is assigned only for a period of time required to complete one LU 6.2 conversation. At the end of the conversation the VM machine is returned to the pool for subsequent assignment to another, possibly different, application program and user.

The method allows two distributed application programs being executed concurrently on the IWS to run concurrently on the host in two separate virtual machines even though the conversation requests have the same USERID. While the above system improves the processing of distributed application programs, it does not address the problem that arises when the terminal resident portion of a distributed application program has been developed to run under an Operating System such as the IBM OS/2 operating system.

It has been found however that in certain situations, system resources, i.e. virtual machines in the pool are wasted, because a virtual machine from the pool is assigned to a conversation originating from a section of a program that must wait on the successful execution of another section of the program before it can begin its task. This situation occurs generally where an application program is designed to run under a multi-tasking operating system such as the IBM OS/2 Operating System which is organized to run three types of multitasking elements, e.g. sessions, processes and threads. An article in the publication "IBM TECH Journal", Vol. 5, No. 11, beginning on page 90, entitled "Multiple Tasks", sets forth in detail the organization of the OS/2 operating system and the concept of "threads". The present invention is directed to a method to avoid the assignment of a virtual machine from the pool to a conversation request involving a program thread that is dependent on the successful execution of a previous thread.

SUMMARY OF THE INVENTION

In accordance with the method of the present invention, when an OS/2 application is running on a PS/2 type personal computer, and requires an LU 6.2 conversation with the host resident counterpart portion of the application, it first obtains its own Process ID (PRID) and Thread ID (THRID) that were assigned by OS/2. OS/2 assigns a unique PRID and THRID to multitasking elements that are to be processed concurrently and the same PRID and THRID to elements that are to be processed serially. The PRID and THRID information is placed in the communications buffer and transmitted to the host with the conversation request. The Pool Manager at the host places the PRID and THRID information in storage in order to determine whether the request should be assigned to an idle virtual machine or to a virtual machine that is currently processing a request originating in a portion of the program having the same ID.

The Pool Manager decides as follows.

If an LU 6.2 conversation does not already exist for the PC which has originated the request, the Pool Manager will assign a virtual machine to service the request by invoking the application program on the assigned virtual machine in accordance with the method of the Cross Referenced application.

If one or more LU 6.2 conversations already exist for the PC which has originated the request, the Pool Manager inspects the data structure for PRID and THRID information to determine if one of the existing conversations has the same PRID and THRID as the new request.

If the PRID and THRID are the same, the request is assigned to the virtual machine that is processing the conversation having the sane PRID and THRID.

If the PRIDs are the same but the THRIDs are different, assign a new virtual machine to service the request and invoke the application so that it runs concurrently with the other program elements having different THRIDs.

The method therefore preserves the use of virtual machine by only assigning a virtual machine from the pool for LU 6.2 conversation requests which originate from OS/2 program elements that are designed to run concurrently with other program elements.

It is therefore an object of the present invention to provide an improved method for executing distributed applications in a data processing network.

A another object of the present invention is to provide an improved method for processing distributed application programs in an SNA type data processing network.

A further object of the present invention is to provide an improved method for processing distributed application programs in an SNA type network employing LU 6.2 protocols, whereby one end user who runs a distributed application program on one terminal under a multitasking operating system does not waste system resources by assigning virtual machines to service LU 6.2 conversation requests which originate from thread elements of the application program that have the same Thread ID.

Objects and advantages other than those mentioned above will become apparent from the following description when read in connection with the drawing.

DESCRIPTION OF THE DRAWING

FIG. 3 illustrates the organization of the various layers of programming that are involved in the SNA network of FIG. 1.

FIGS. 4A and 4B show the relationships between parts of a distributed application program.

FIGS. 6A and 6B illustrate the details of the virtual machine pool data structure that is employed by the Pool Manager in managing the pool of virtual machines shown in FIG. 5.

DESCRIPTION OF THE PREFERRED EMBODIMENT

Figure 1:
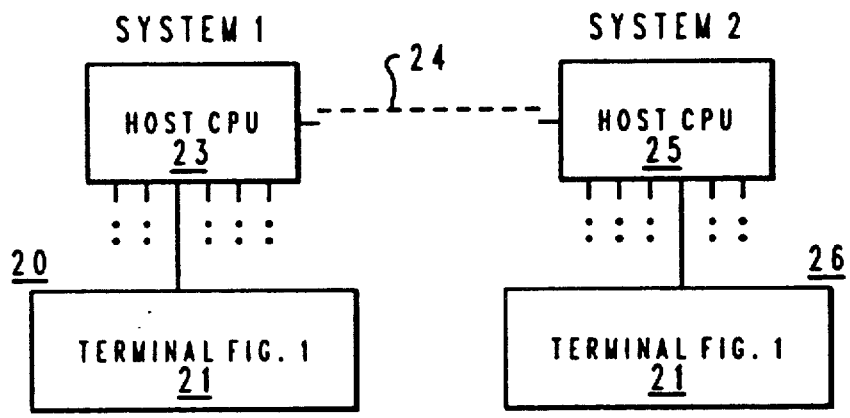
FIG. 1 is a schematic design of a data processing network.
Figure 2:
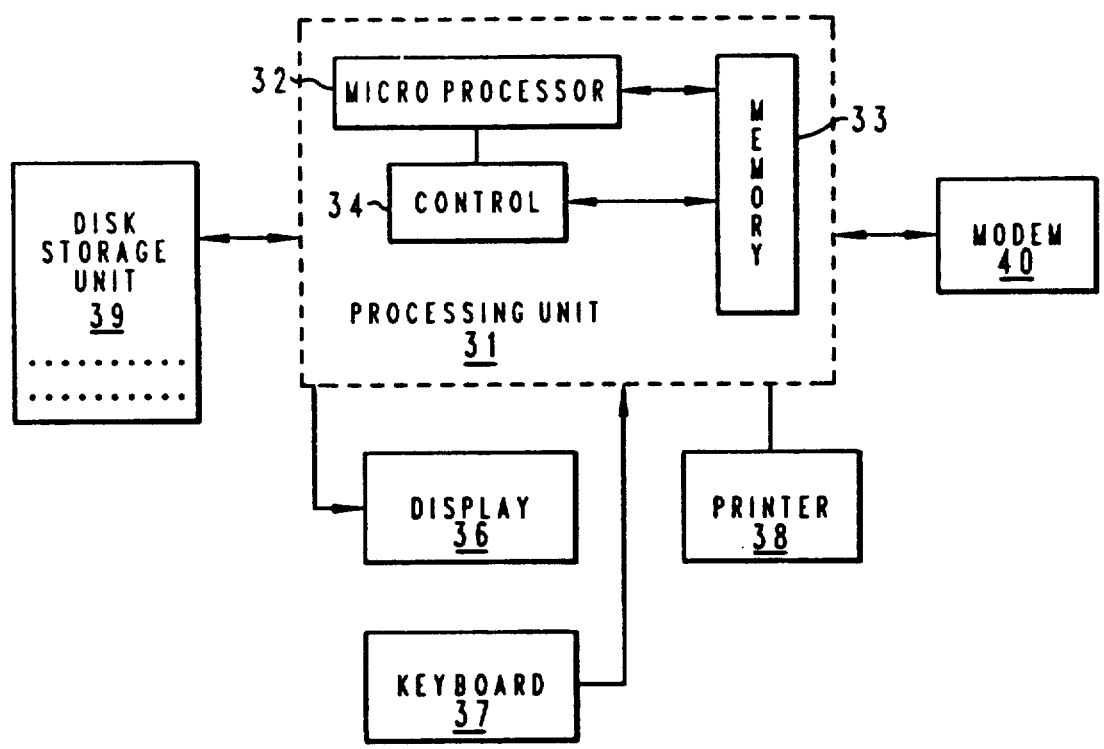
FIG. 2 is a schematic representation of one of the IWS terminals shown in FIG. 1.

FIG. 1 illustrates an information handling system comprising an SNA network 20 of interactive type terminals or Intelligent Work Stations (IWS) 21 of the type shown in detail in FIG. 2. As described, the network includes a plurality of terminals 21 which are interconnected to a host central processing system 23. As shown in FIG. 1, host 23 in turn is connected by communication link 24 to a host processing system 25, which also connects to another SNA network 26 of interactive terminals 21. Functionally, the system operates to allow each terminal or end user to communicate with the host and to one or more other terminals or users using established SNA communication protocols so that the various serially connected communication links are transparent to the users.

The host system includes a host processing unit which may by way of example be an IBM 360 or an IBM 370 system and a virtual machine type operating system such as the IBM VM or MVS Operating Systems.

It should be assumed that the SNA network shown in FIG. 1 supports two distributed applications referred to as "MAIL" and "CALENDAR" which are available to each terminal user. The MAIL application program allows a user at one terminal 21 to generate a document such as a letter and send that letter to one or more other users at a designated nodes on the network. The sender can store the document in the host system 23 at some logically central system location. Each addressee of the letter has the capability of retrieving that document at a later time by also using the MAIL application program from his terminal 21. The CALENDAR application functions to maintain an electronic calendar for each terminal user. The CALENDAR application, for example, allows one end user to view other end users' calendars prior to scheduling a meeting in order to determine free periods of those persons being invited to the meeting. Such systems are well known in the art and are currently in extensive commercial use. Since the general organization and operation of such distributed applications is well known, only those details that are necessary for an understanding of the method of processing data in distributed application programs of the present invention will be described.

It should therefore be assumed in the following description that each workstation on the network 20 is an Intelligent Work Station such as an IBM PS/2 personal computing system employing a multitasking operating system such as the IBM OS/2 Operating System. It may be further assumed that conventional SNA services to support Logical Unit type LU 6.2 sessions and conversations for distributed applications are provided by the system. The terminal 21 shown in FIG. 1 may therefore process two distributed application programs such as MAIL and CALENDAR concurrently.

FIG. 2 illustrates the functional components of one of the interactive type data processing terminals 21, shown in FIG. 1. The terminal comprises a processing unit 31, which includes a microprocessor block 32, which is, for example, an Intel 80386 micro-processor, a semi-conductor memory 33, a control block 34 which functions to control input-output operations in addition to the interaction between the microprocessor block 32 and the memory unit 33.

The terminal further includes a group of convention peripheral units including a display device 36, keyboard 37, printer 38, a storage unit 39, and modem 40. Since the details of the above described functional blocks form no part of the present invention and can be found in the prior art, only brief functional description of each block is set forth along with the description of their interaction, sufficient to provide a person of ordinary skill in the art with the basis of understanding applicant's improved method of processing distributed application programs concurrently.

Processing unit 31 corresponds, for example, to the system unit of an IBM personal computer such as the IBM PS/2 model 80 system. Unit 31 is provided with an operating system program which may be the IBM multi-tasking OS/2 operating system which is normally employed to run the PS/2 model 80. The operating system program is stored in memory 33 along with the application programs that the user has selected to run. When the system supports a distributed application program such as MAIL or CALENDAR, only one part, e.g., part A of the distributed application program is stored at the terminal while the other part, part B, is stored at the host system. Depending on the capacity of memory 33 and the size of the application programs, portions of these programs as needed may be transferred to memory 33 from the disk storage unit 39 which may include, for example, a 40 megabyte hard disk drive and a diskette drive. The basic function of storage unit 39 is to store programs and data that are employed by the system and which may readily be transferred to the memory unit 33 when needed. The function of the diskette drive is to provide a removable storage function for entering programs and data into the system and a vehicle for storing data in a form that is readily transportable for use on other terminals or systems.

Display 36 and keyboard 37 together provide for the interactive nature of the terminal, in that in normal operation the interpretation that the system gives to a specific keystroke by the operator depends, in substantially all situations, on what is being displayed to the operator at that point in time.

In some situations the operator, by entering commands into the system, cause the system to perform a certain function. In other situations, the system requests the entry of certain data generally by displaying a prompt type of menu/message screen. The depth of the interaction between the operator and the system varies by the type of operating system and the application program, but is a necessary characteristic of terminals on which the method of the present invention may be employed.

The terminal shown in FIG. 2 further includes a printer 38, which functions to provide hard copy output of data. Lastly, the modem 40 functions to transfer data from the terminal 21 of FIG. 2, to a host system through one or more SNA communication links.

FIG. 3 shows the various layers of programming that are employed in an SNA type network. The SNA programming environment is generally considered to consist of seven layers L1–L7 as shown. The top layer L1 as shown is the End User layer and consists of the end user programs. The second layer L2 is called the NAU Services. These services include, for example, presentation services, terminal services and formatting data for specific applications. The third layer L3 is referred to as Data Flow Control. Its function is to maintain send/receive modes and perform high level error correction. The fourth layer L4 is the data Transmission Control layer. Its function involves such things as encryption and decryption plus session level pacing. The fifth layer L5 is the Path Control which does routing, segmenting data units and virtual route pacing. The Data Link layer L6 is the sixth layer. It functions to provide link level addressing, sequencing and error control. The seventh and last layer is the Physical layer L7 which defines for example the pin assignments on connectors for the various signals.

APPC defines the NAU services, Data Flow Control and Transmission Control. As explained on page 306 of the previously referenced IBM Systems Journal, the method of defining the LU 6.2 conversation functions, is in terms of programming-language-like statements called verbs. Documentation with verbs which are completely defined by the procedural logic that generates session flows, provides significantly greater precision than English prose.

FIG. 4A shows how the verbs define the interaction between transaction programs, i.e., part A or part B of the distributed application program, and Logical Units, for conversation resources. A set of verbs is referred to as a protocol boundary rather than as an application program interface. As shown in FIG. 4A, the presentation services component 42 interprets verbs and can be thought of as including a subroutine for each verb. The LU resource manager 43 does allocation of conversation resources and assignment of conversations to the sessions, keeping queues of free sessions and pending allocation requests. Its equivalent component in products also allocates local resources in products specific ways. The function of the following LU 6.2 verbs is set forth on page 307 of the previously mentioned IBM System Journal.

The 6.2 verbs discussed are SEND_DATA, RECEIVE_AND_WAIT, PREPARE_TO_RECEIVE, FLUSH, REQUEST_TO_SEND, SEND_ERROR, CONFIRM, ALLOCATE AND DEALLOCATE.

The ALLOCATE verb initiates new activity at another LU by building a conversation to a named partner program. The named partner is placed in execution and given addressability to the conversation that started it. The ALLOCATE verb carries several parameters including the following.

1. LU_NAME: This is the name of the LU at which the partner program is located.
2. TPN: TPN is the Transaction Program Name of the partner program with which the conversation is desired.
3. MODE_NAME: MODE_NAME specifies the type of transportation service that the conversation is to provide. For example, a SECURE, a BULK, or a LOW_DELAY conversation can be requested. The LU uses a session with the appropriate MODE_NAME to carry the conversation.

The target of the conversation is a newly created process or task, which means that the distributed processing in the network in any instance of time consists of a number of independent distributed transactions, each of which consists of two or more transaction programs connected by a conversation. The DEALLOCATE verb ends the conversation. In as much as each partner may issue DEALLOCATE, a conversation varies from a single short message to many exchanges of long or short messages. A conversation could continue indefinitely, terminated only be a failure of a Logical Unit or by the session that carries it. Transaction programs are not ended by DEALLOCATE, but continue until they terminate their own execution, end abnormally or are terminated by control operator action.

Both network application programs and service transaction programs use the execution services provided by Logical Units. Service transaction programs run on Logical Units in the same way as other transaction programs. They interact with the human operator or they may run as a pure programmed operator. Many service transaction programs effect only the local Logical Unit. An example is a command to display the current set of active transaction programs.

Other control transactions, especially those that relate to sessions, can effect other Logical Units as well as applications at other Logical Units. For example, a local command to prematurely terminate a transaction that is using a conversation causes the conversation to be ended abnormally, a state change that must be transmitted to the partner Logical Unit for presentation to the transaction program that is sharing the conversation. Or a decision to activate one or more of the sessions shared by the two LUs may be made by one LU operator but must be communicated to the other Logical Unit. Advanced program to program communication for SNA includes several control operator verbs that provide LU to LU control and coordination, especially for activation and deactivation of sessions. When a distributed service transaction program starts at one LU, it creates a conversation to a partner transaction program in a partner LU. The two transaction programs then cooperate to preform the desired control activity.

The IBM VM host operating system includes a component referred to as APPC/VTAM Services (AVS) which is responsible for the APPC protocol boundary support in the Operating System. AVS defines one or more LU 6.2 Logical Units to IBM Virtual Telecommunications Access Method (VTAM). VTAM is the IBM host computer component that manages the communications layer between the host and the various terminals of the network. AVS acts as a bridge for APPC communications to virtual machines within the operating systems. For example, when an APPC ALLOCATE verb is received that originated from outside the VM operating system, VTAM will determine if there is a Logical Unit active that corresponds to the LU name specified in the ALLOCATE. AVS will have previously told VTAM that it will handle all traffic for particular LU names. VTAM will find that AVS has defined an LU that corresponds to the LU name in the ALLOCATE verb and pass the ALLOCATE verb to AVS.

There is additional information supplied with the ALLOCATE that is used in this process. Included in the ALLOCATE is a User ID, the identification of the user that the ALLOCATE was submitted in behalf of, and a Transaction Program Name (TPN). The TPN is the application program to be invoked, that is the part B of the distributed application such as MAIL. At the time AVS receives the ALLOCATE, it will create a virtual machine and pass the transaction program named in ALLOCATE to an operating system component that is resident in the virtual machine. The operating system component in the virtual machine will activate the named application which then proceeds with various initialization routine after which interaction can occur between the part A and part B of the application.

Figure 4B:
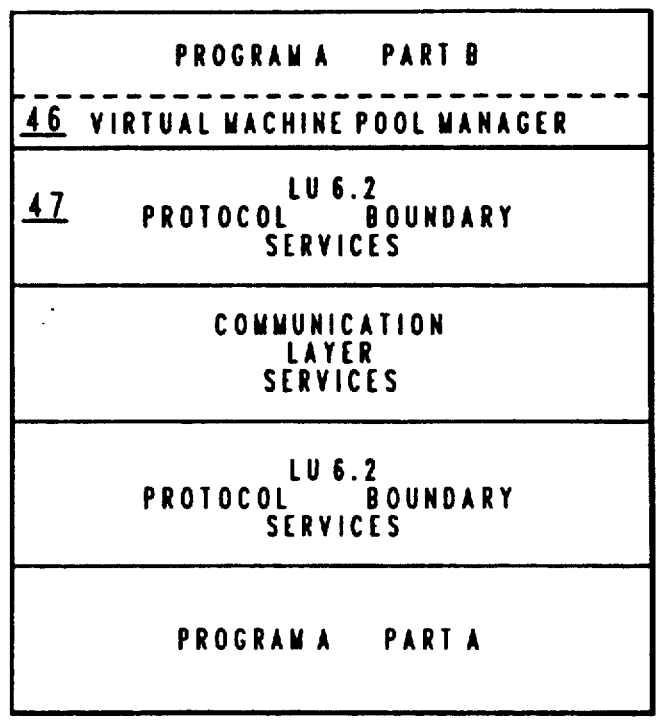
Figure 5:
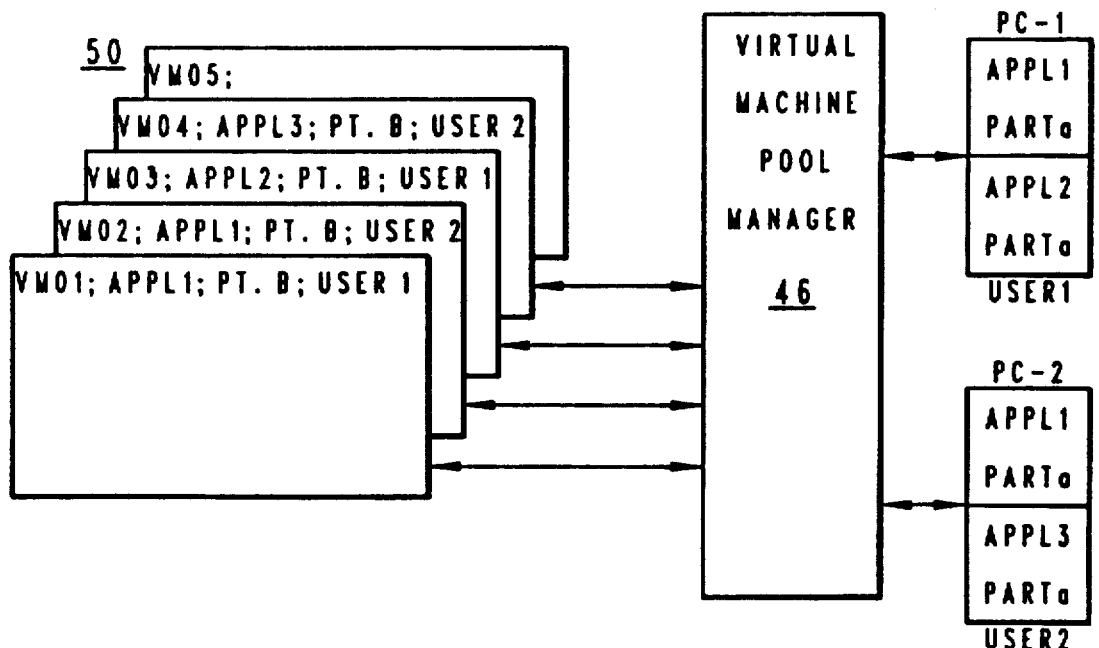
FIG. 5 is a schematic representation of the pool of run ready virtual machines.

In accordance with the method of the present invention, an additional function, referred to as a VM Pool Manager (VMPM) 46, shown schematically in FIG. 4B, has been added to the LU 6.2 Protocol Boundary services 47 of the prior art. The VMPM 46 operates in the same virtual machine as does the Protocol Boundary services 47 which, in the IBM VM operating system, is called the AVS module. When activated, the VMPM 46 will read a set of installation supplied parameters and create a plurality of virtual machines 50 that are brought to the run ready state. Included in these parameters are the generic names of the virtual machines to be created in the pool. The generic names or virtual machines IDs will previously have been defined to the Operating System's directory of virtual machines. The VMPM 6 issues an Autolog macro for each of the machines. The Autolog macro is a known function in the VM operating system. When issued for a particular named virtual machine 50, it will result in that machine being created and placed in a state such that it is waiting for work, i.e. an assignment to a host resident portion of a distributed application program.

The above described operations are similar to those described in the cross-referenced application Ser. No. 07/261,861, now U.S. Pat. No. 5,062,037. In addition to those operations, the method of the invention described in the second cross-referenced application Ser. No. 07/250,598, now U.S. Pat. No. 4,949,254, which primes a predefined number of virtual machines with the host resident portion of a preselected distributed application program may also be employed. This step of priming involves selecting a named virtual machine and activating the preselected distributed application program on the selected machine. Activating the program causes the program to initialize itself on the machine to a point that it can respond to the first LU 6.2 ALLOCATE verb that is passed to it from AVS and accept the requested conversation.

The priming process is described in detail in the cross referenced application and is not repeated here.

Figure 6C:
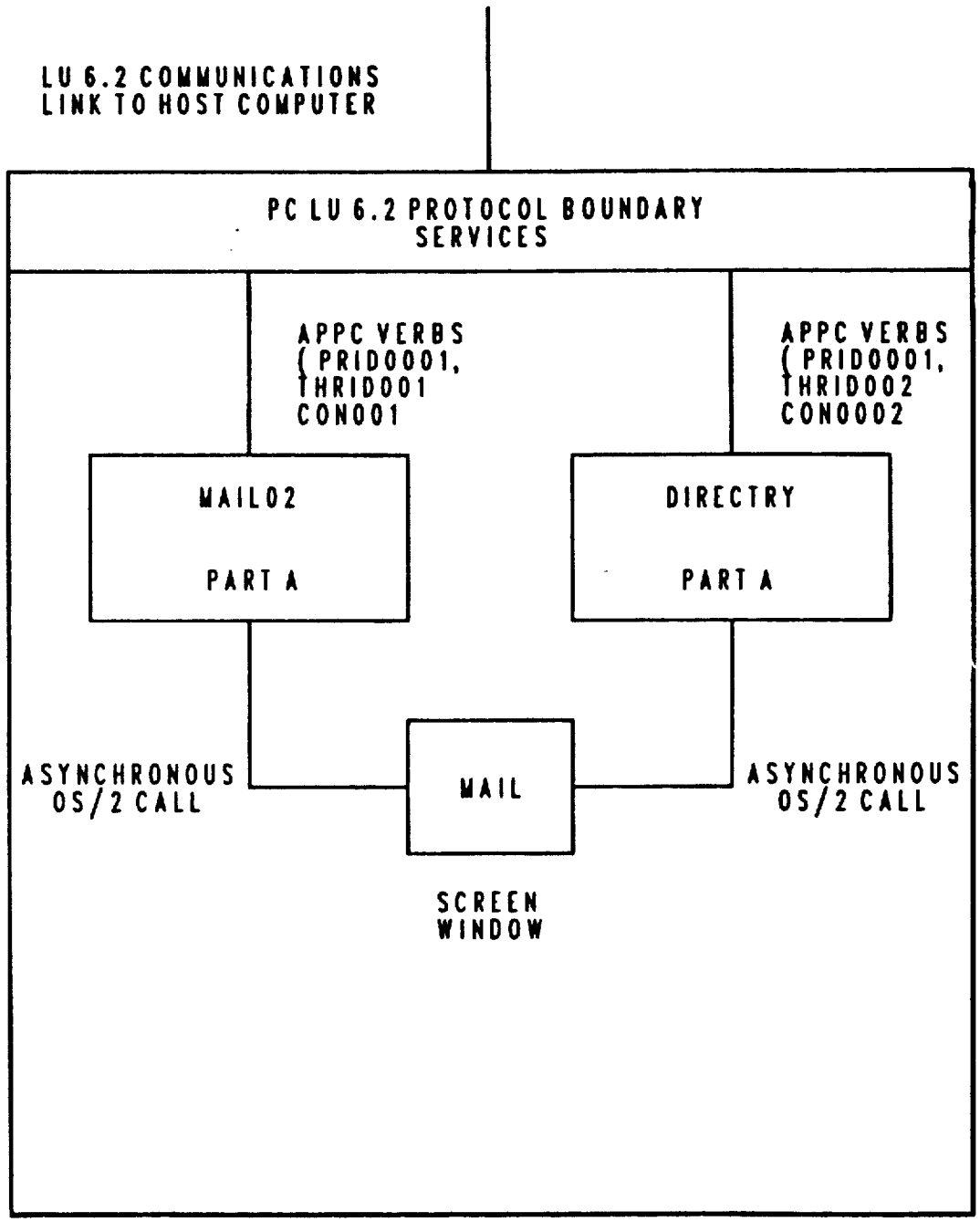
FIG. 6C illustrates the organization of that various programs at the terminal.

As each machine 50 is successfully created by the Autolog macro, the VMPM 46 will create an entry in a VMPM 46 data structure 56 shown in FIG. 6 a representing that virtual machine and its state, in control blocks that are owned by the VM pool manager 46. When all virtual machines 50 in the list have been created, the VMPM will return control to the AVS. After the virtual machines 50 have been created and the pool manager 46 has returned control to the AVS, the following scenario occurs.

The IWS 21 may be assumed to be provided with a programming organization which allows the terminal to run two application programs concurrently, such as the IBM OS/2 operating system. The terminal operator interactively enters information into his terminal to invoke the distributed application program MAIL. The MAIL application MAIL01 creates a window on the screen of the display device 36. When MAIL01 is activated OS/2 assigns a Process ID (PRID) and a Thread ID (THRID) which remain assigned to MAIL01 until it terminates. The PRID assigned is PRID0001 and the THRID assigned is THRID001. Assume that as part of its processing MAIL01 determines that it must invoke another mail component, MAIL02, to satisfy the terminal user's request. MAIL01 calls MAIL02 using a synchronous OS/2 call. A synchronous call in OS/2 results in MAIL01 giving up control to MAIL02. MAIL01 cannot do further processing until MAIL02 returns control. MAIL02 is assigned the same PRID and THRID as MAIL01. MAIL02 issues the ALLOCATE verb to establish an LU 6.2 conversation with its host Part B application partner. The following pertinent parameters are specified:

LU name=LU 1,

TPN=MAIL02,

USERID=DICKC.

PRID=PRID0001.

THRID=THRID001.

CONID=CONID001.

As indicated above, a conversation Id is assigned each conversation which flows with the ALLOCATE verb. Likewise in accordance with the new method, the PRID AND THRID identifier are sent along with the ALLOCATE When VTAM receives the ALLOCATE verb, it sees that an LU named LU 1 was defined by AVS and it passes the allocate to AVS. AVS sees that LU 1 is associated with the pool manager so it activates the pool manager component of AVS and passes the ALLOCATE information to it.

The Pool Manager 46 scans its control block 52 entries that represent virtual machines in the VM pool to determine if the user already has a virtual machine in the pool doing work on his behalf. The scan looks to see if the USERID in the ALLOCATE matches any of the entries in the data structure shown in FIG. 6. Assume that in the example no match is found. The VMPM 46 then assigns an available idle virtual machine from the pool, updates relevant information in the data structure 52 to reflect the activity as shown in FIG. 6a. The update includes the following:

The identity of the virtual machine assigned=VM01.
The identity of the user USERID=DICKC.
The name of the user's terminal=TERM0001.
Change BUSY indicator to YES.
Set pointer to address of Control Block Extension 1.
Update Control Block Extension 1 with ALLOCATE Parameters

CONID=CON001

PRID=PRID0001

THRID=THRID001

TPNNAME=MAIL02.

The Pool Manager changes the LU Name parameter of the ALLOCATE to the name of the newly assigned virtual machine, i.e. VM0111. The pool manager then re-issues the ALLOCATE verb with the changed LU name.

The VM operating system will then pass the ALLOCATE to the operating system code resident in the selected virtual machine. That code then activates Part B of the named application MAIL02. A conversation is then conducted between part A and part B of the MAIL02 application program. It will be assumed that in the present example that when Part A and Part B complete their interaction, the conversation is left active, that is neither partner issues a DEALLOCATE, and that control is passed back to MAIL01, Part A from Part A of MAIL02. When this occurs both parts of MAIL02 are active but in a wait state. Virtual machine VM01 is still dedicated to the user and contains Part B of MAIL02, and the control block entries are as previously described.

Next assume that when MAIL01 regains control, it determines that directory information is required to continue processing the initial user's request. An OS/2 synchronous call as shown in FIG. 6A is therefore made to invoke an application program named DIRECTRY. Control is then passed to the DIRECTRY program which as indicated previously is also assigned the same PRID and THRID as MAIL01. DIRECTRY, Part A issues an ALLOCATE to establish a conversation with its Part B counterpart at the host. The AVS component of the VM Operating System passes the ALLOCATE to the VMPM 46 which then proceeds as follows;

Determine if the user has a virtual machine doing work on his behalf by scanning the data structure. In this example it is determined that VM01 is dedicated to this user.

Determine if the PRID and THRID of the ALLOCATE are the same as the PRID and THRID stored in the Control Block Extension 1 (FIG. 6) by referencing the memory pointer in the anchor block of the data structure.

Since a match was found, it can be concluded that serial processing is occurring at the terminal and there is therefore no need to assign a different virtual machine to the requested DIRECTRY application. The application is therefore assigned to VM01 for processing and the Pool Manager updates the data structure as shown in FIG. 6B and described below.

Control Block Extension 2 is created by obtaining storage at address position 00010100 and places that address in the pointer field of Extension 1. The conversation ID CON002 and the TPN, DIRECTRY are added to extension 2 and the pointer field is set to zero to indicate that this is the last extension.

When DIRECTRY Parts A and B complete their interaction Part A issues A DEALLOCATE and the conversation is terminated. VMPM 46 frees address position 00010100 and sets the pointer in Extension 1 to zero. VM01 is not returned to the pool since its control blocks indicate that it is active. When DIRECTRY Part A at the terminal terminates it returns control to MAIL01.

Assume that as part of its processing, MAIL01 returns control to MAIL02 Part A and that further interaction occurs until such time that Part A issues a DEALLOCATE and Part B terminates. The Pool Manager frees address location 00001000 containing Extension 1, resets the Pointer, USERID and PCID fields to zero and sets the Busy indicator to NO. Meanwhile the results the above processing of the MAIL01 application are displayed to the user on the display.

If MAIL01 had issued an asynchronous OS/2 call for either or both MAIL02 or DIRECTRY 1, the processing would be different. OS/2 processes program threads concurrently when the PRID/THRID identifications are different. An asynchronous call would have changed thr THRID but not the PRID. If for example in the above scenario DIRECTRY had been invoked by MAIL01 with an asynchronous call processing by the Pool Manager would have determined that the THRIDS were different and would have assigned a new idle virtual machine so that the processing could be concurrent at the IWS and the host. If multiple conversations exist for the PRID/THRID and the one to be DEALLOCATED is represented by a control block extension that is the last in the chain, the VMPM 46 will free the storage for that control block and set the pointer in the previous block to zero. If the block to be deleted is in the middle of a chain of control blocks the VMPM will set pointer of the previous block to the address of the block succeeding the block to be deleted. Lastly if the block to be deleted is the first control block, the VMPM will create a new Extension 1, with selected information from the one to be deleted and information from the next one in the chain.

It will be seen that in accordance with the above process, a single conversation defined by an ALLOCATE and a DEALLOCATE is handled by an assigned virtual machine from the pool of virtual machines under the control of the Pool Manager. If the conversation request originated from an application program element that has the same PRID and THRID as an element that is currently being serviced, indicating that it had been coded to run in a serial fashion relative to the preceding element having the same THRID, the request would be assigned to a new idle virtual machine, if it were not for the present invention. The assignment by prior art methods thus wasted the resources of that machine since it must wait to start its task for the completion of the preceding task with the same THRID that is executing on another machine.

In summary, to avoid this situation, the method of the present invention involves the step of obtaining the Process ID and the Thread ID that is assigned to the segment of the distributed application program that corresponds to the conversation request when the request is sent to the host. The Pool Manager, prior to making an assignment of an idle virtual machine to the request determines if a conversation request is being processed which has been assigned the same THRID by the OS/2 Operating System and which has been stored in the Pool Manager's Data Structure. If an active virtual machine entry has the same THRID stored, than the new request is assigned to that machine to be processed after the current request has completed.

If the THRID is different from all stored THRIDS, the request is assigned to a new virtual machine from the pool.

Figure 7:
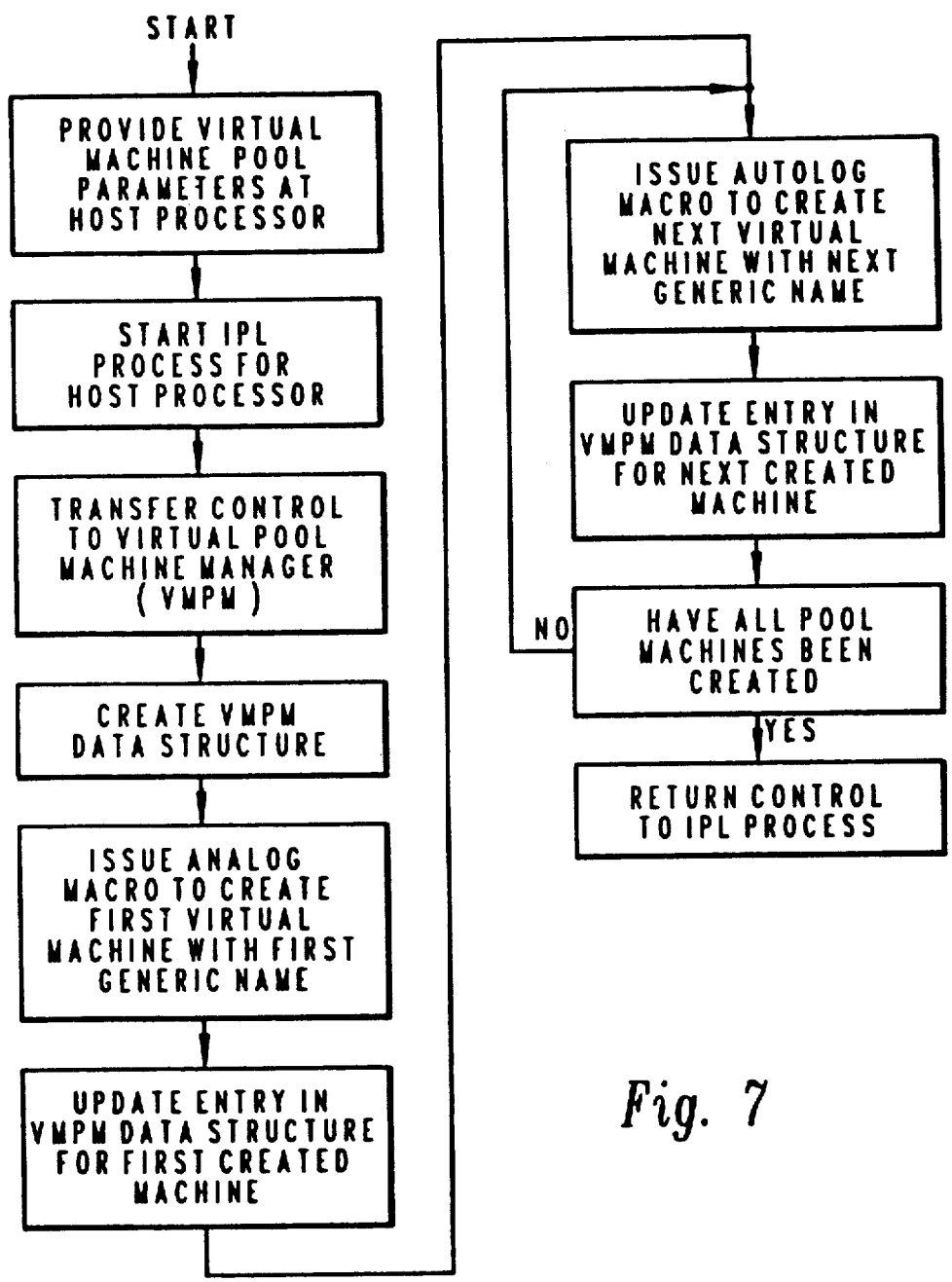
FIG. 7 is a flow chart setting forth the steps involved in creating the pool of virtual machines shown in FIG. 5.

FIG. 7 sets forth a flow chart of the steps involved in creating the virtual machine when the host system is initially IPLed. The flow chart of FIG. 7 summarizes the steps discussed above.

Figure 8A:
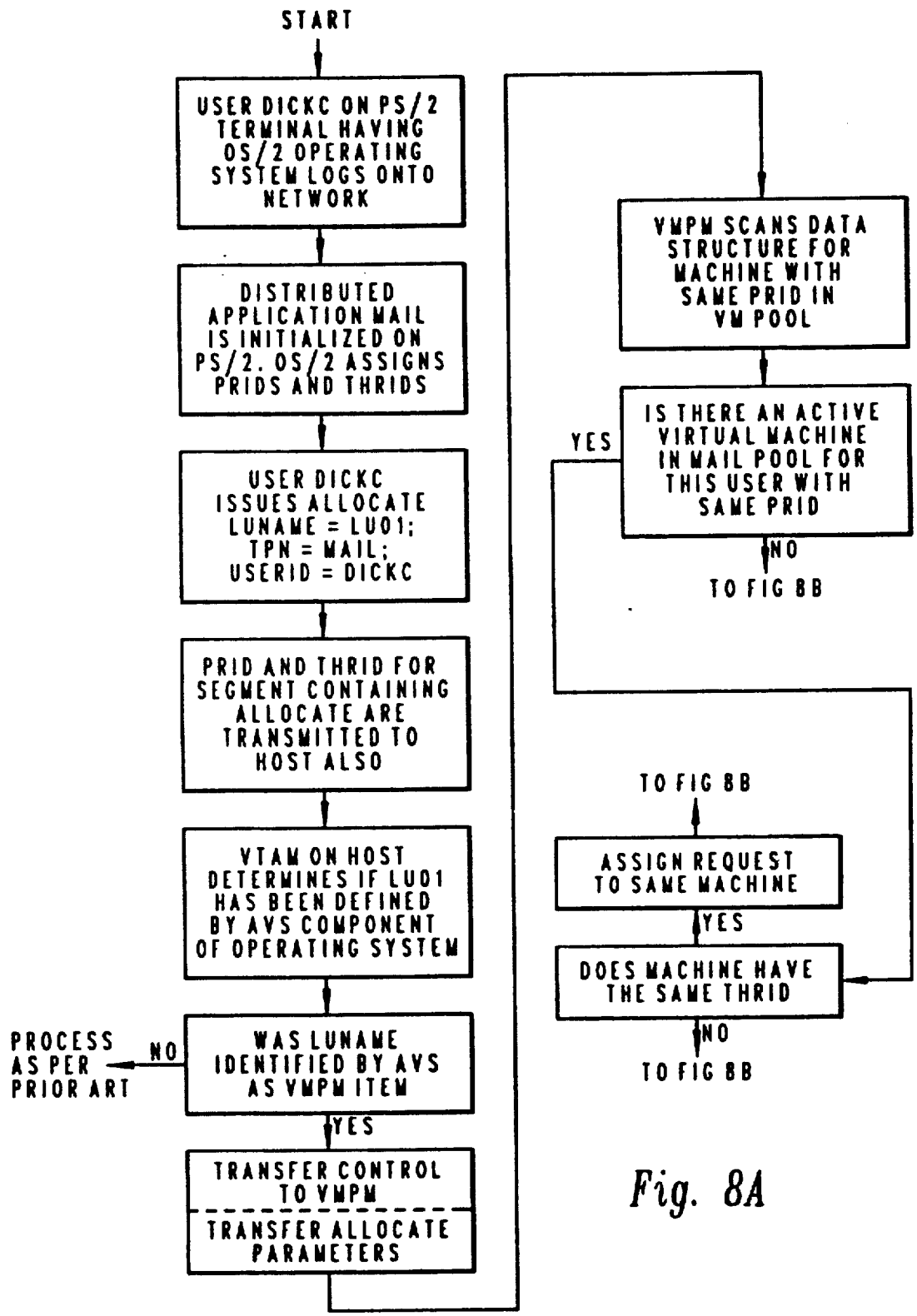
FIGS. 8A and 8B are flow chart setting forth the steps involved by the pool manager in executing a distributed application program in accordance with the new method.
Figure 8B:
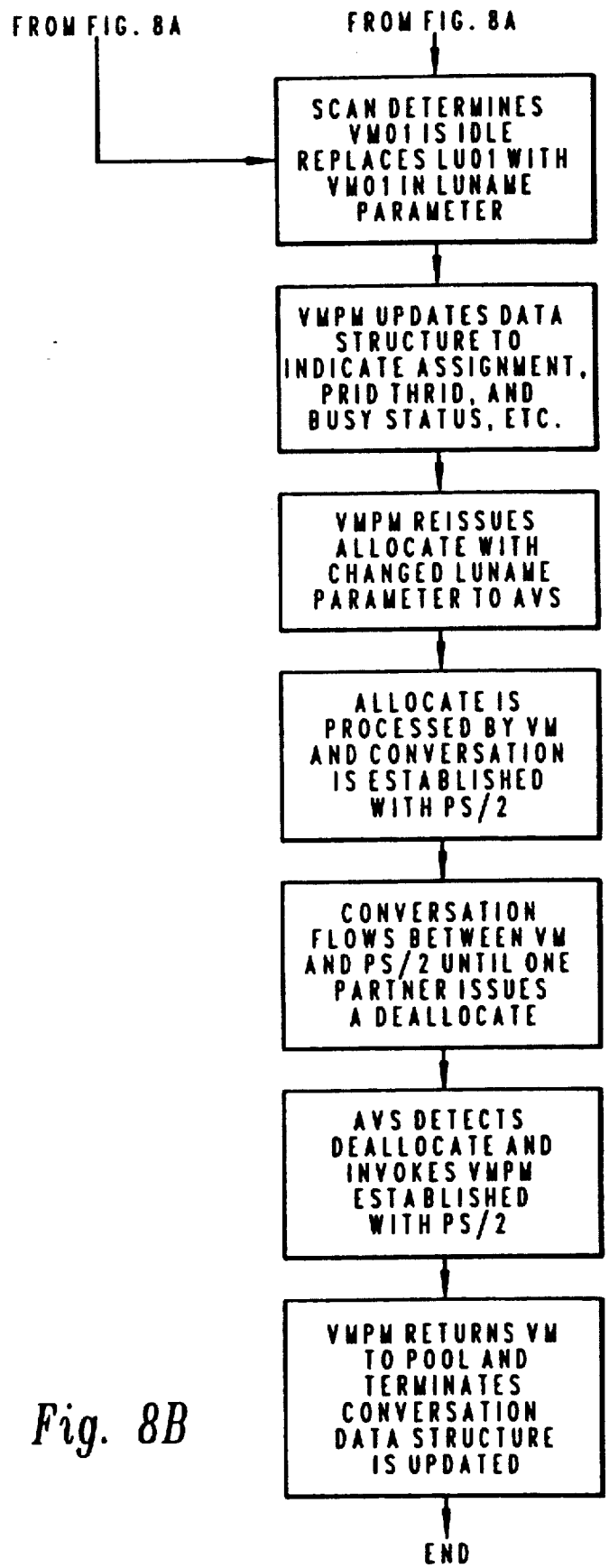

FIG. 8 sets forth a flow chart of the steps involved in the program to program communication process in accordance with the new method for distributed application programs.

While the invention has been shown and described with reference to the preferred embodiment, it should be understood by those persons skilled in the art that changes and modifications may be made without departing from the spirit of the invention or the scope of the appended claims.

I claim:

1. A method in a data processing system for the efficient execution of distributed application programs in a data processing network having a plurality of workstations including at least one multi-tasking workstation having a plurality of concurrent and sequential applications and a host processor having a pool of existing and idle virtual machines each of which is in a ready state for assignment in response to requests from said workstations, said method comprising the data processing system implemented steps of:

identifying those applications among said plurality of applications within said multi-tasking workstation which may be executed concurrently;

identifying those applications among said plurality of applications within said multi-tasking workstation which must be executed sequentially; and automatically assigning a single virtual machine among said pool of virtual machines to process each of said applications identified within said multi-tasking workstation which must be executed sequentially while automatically assigning a different virtual machine among said pool of virtual machines to process each of said applications identified within said multi-tasking workstation which may be executed concurrently in response to requests received from said multi-tasking workstation.

2. The method in a data processing system for the efficient execution of distributed application programs in a data processing network according to claim 1, wherein said steps of identifying those applications among said plurality of applications within said multi-tasking workstation which may be executed concurrently and identifying those applications among said plurality of applications within said multi-tasking workstation which must be executed sequentially include the step of providing an operating system within said multi-tasking workstation which attaches a process identifier and a thread identifier to predefined segments within each of said applications within said multi-tasking workstations.

3. The method in a data processing system for the efficient execution of distributed application programs in a data processing network according to claim 2, wherein said step of providing an operating system within said multi-tasking workstation which attaches a process identifier and thread identifier to predefined segments within each of said applications within said multi-tasking workstation comprises providing an operating system within said multi-tasking workstation which attaches an identical thread identifier to all predefined segments which must be executed sequentially.

4. The method in a data processing system for the efficient execution of distributed application programs in a data processing network according to claim 3, wherein said step of providing an operating system within said multi-tasking workstation which attaches a process identifier and thread identifier to predefined segments within each of said applications within said multi-tasking workstation comprises providing an operating system within said multi-tasking workstation which attaches a different thread identifier to each predefined segment which may be executed concurrently.

5. The method in a data processing system for the efficient execution of distributed application programs in a data processing network according to claim 4, further including the step of transmitting said attached process identifier and thread identifier in association with each application during a request by said multi-tasking workstation to said host processor.

6. A data processing network having a plurality of workstations including at least one multi-tasking workstation having a plurality of concurrent and sequential applications and a host processor having a pool of existing and idle virtual machines each of which is in a ready state for assignment in response to requests from said workstations, said data processing network comprising:
  means for identifying those applications among said plurality of applications within said multi-tasking workstation which may be executed concurrently;
  means for identifying those applications among said plurality of applications within said multi-tasking workstation which must be executed sequentially; and
  means within said host processor for automatically assigning a single virtual machine among said pool of virtual machines to process each of said applications identified within said multi-tasking workstation which must be executed sequentially while automatically assigning a different virtual machine among said pool of virtual machines to process each of said applications identified within said multi-tasking workstation which may be executed concurrently in response to requests received from said multi-tasking workstation, wherein distributed application programs may be executed efficiently.

7. The data processing network according to claim 6, further including operting system means within said multi-tasking workstation for attaching a process identifier and a thread identifier to predefined segments within each of said applications within said multi-tasking, workstation.

8. The data processing network according to claim 7, wherein said operating system, means within said multi-tasking workstation for attaching a process identifier and a thread identifier to predefined segments within each of said applications within said multi-tasking workstation further includes means for attaching an identical thread identifier to all predefine segments within each of said applications within said multi-tasking workstation which must be executed sequentially.

9. The data processing network according to claim 8, wherein said operating system means within said multi-tasking workstation for attaching a process identifier and a thread identifier to predefined segments within each of said applications within said multi-tasking workstation further includes means for attaching a different thread identifier to each predefined segment within each application within said multi-tasking workstation which may be executed concurrently.

10. The data processing network according to claim 9, further including means for transmitting said attached process identifier and thread identifier in association with each application during a request by said multi-tasking workstation to said host processor.

* * * * *

UNITED STATES PATENT AND TRADEMARK OFFICE
CERTIFICATE OF CORRECTION

PATENT NO. : 5,201,049
DATED : April 6, 1993
INVENTOR(S) : David U. Shorter It is certified that error appears in the above-identified patent and that said Letters Patent is hereby corrected as shown below:

Please change Col. 16, line 23, "operting" to --operating--;
and Col. 16, line 34 "predefine" to --predefined--.

Signed and Sealed this

Eleventh Day of January, 1994

Attest:

BRUCE LEHMAN

Attesting Officer     Commissioner of Patents and Trademarks